United States Patent
Hasegawa (10) Patent No.: US 9,075,442 B2
(45) Date of Patent: Jul. 7, 2015

(54) IMAGE PROCESSING APPARATUS, METHOD, AND COMPUTER-READABLE STORAGE MEDIUM CALCULATION SIZE AND POSITION OF ONE OF AN ENTIRE PERSON AND A PART OF A PERSON IN AN IMAGE

(75) Inventor: Yuichi Hasegawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 527 days.

(21) Appl. No.: 13/012,264

(22) Filed: Jan. 24, 2011

(65) Prior Publication Data

US 2011/0221768 A1  Sep. 15, 2011

(30) Foreign Application Priority Data

Mar. 10, 2010 (JP) ................................ 2010-052920

(51) Int. Cl.
G09G 5/00 (2006.01)
G06F 3/01 (2006.01)
G06F 3/0481 (2013.01)
G06F 3/0482 (2013.01)
H04N 5/44 (2011.01)
H04N 7/18 (2006.01)
G06T 1/00 (2006.01)

(52) U.S. Cl.
CPC ......... G06F 3/017 (2013.01); H04N 2005/4428 (2013.01); G06F 3/011 (2013.01); G06F 3/0481 (2013.01); G06F 3/0482 (2013.01); H04N 7/183 (2013.01); A63F 2300/1087 (2013.01); G06T 1/0007 (2013.01)

(58) Field of Classification Search
CPC ....... G06F 3/017; G06F 3/011; G06F 3/0481; G06F 3/0482; A63F 2300/1087; G06T 1/0007; H04N 2005/4428; H04N 7/183
USPC .................................... 345/629, 173; 715/863
See application file for complete search history.

(56) References Cited

U.S. PATENT DOCUMENTS

| | | | |
|---|---|---|---|
| 2006/0262187 A1* | 11/2006 | Takizawa | 348/77 |
| 2007/0013718 A1* | 1/2007 | Ohba | 345/629 |
| 2007/0013719 A1* | 1/2007 | Yamamoto | 345/629 |
| 2007/0279485 A1* | 12/2007 | Ohba et al. | 348/41 |
| 2008/0186285 A1* | 8/2008 | Shimizu | 345/173 |
| 2008/0189661 A1* | 8/2008 | Gundlach et al. | 715/863 |
| 2010/0098397 A1* | 4/2010 | Yata | 396/124 |
| 2010/0141784 A1* | 6/2010 | Yoo | 348/222.1 |
| 2010/0157254 A1* | 6/2010 | Ishii | 353/69 |
| 2011/0018864 A1* | 1/2011 | Ishibashi | 345/419 |
| 2011/0093821 A1* | 4/2011 | Wigdor et al. | 715/863 |
| 2011/0169746 A1* | 7/2011 | Kitajima | 345/173 |
| 2011/0181621 A1* | 7/2011 | Ohba et al. | 345/629 |

FOREIGN PATENT DOCUMENTS

JP  2008-40576  2/2008

* cited by examiner

Primary Examiner — Jin-Cheng Wang
(74) Attorney, Agent, or Firm — Oblon, McClelland, Maier & Neustadt, L.L.P.

(57) ABSTRACT

There is provided an image processing apparatus including: a detecting unit detecting one of an entire person and a part of a person in an image produced by image data acquired by image pickup by an imaging unit; a position/size calculating unit calculating a size and a position of the detected one of the entire person and the part of the person in the image; and a GUI disposing unit disposing graphical user interface (GUI) elements, which are to be displayed by being superimposed on the image produced by the image data, on the image based on the calculated size and position.

12 Claims, 12 Drawing Sheets

IMAGE PROCESSING APPARATUS, METHOD, AND COMPUTER-READABLE STORAGE MEDIUM CALCULATION SIZE AND POSITION OF ONE OF AN ENTIRE PERSON AND A PART OF A PERSON IN AN IMAGE

BACKGROUND OF THE INVENTION

1. Field of the Invention

The present invention relates to an image processing apparatus, an image processing method, and a program.

2. Description of the Related Art

Remote operation of consumer electronics (hereinafter, "CE appliances") such as a mobile music player and a digital photo viewer is typically carried out by a user operating a remote controller. However, with this method, an apparatus called a "remote controller" is required. For this reason, there is also a technology for enabling a user to operate an appliance by way of gestures made by the user's body and/or hands without using a remote controller.

For example, there is a technology that uses 3D sensors, which are capable of acquiring depth information by emitting infrared light and measuring reflected light, to detect a region corresponding to a person and body movements in the reflected image. There is also a technology that uses a normal camera and mainly recognizes moving regions in video images as body movements of a person. As one example, video games that apply such technologies have been commercialized.

As examples, Japanese Laid-Open Patent Publication Nos. 2008-40576 and 2004-78977 and Japanese Laid-Open Patent Publication (Translated PCT Application) No. 2009-519552 disclose technologies for using a normal camera to recognize the shape of a person's hand in particular, and recognizing gestures based on a shape pattern and changes in position of the hand. As an extension to such proposed technologies, technology for recognizing hands or people themselves from video images has been developed, as disclosed in Japanese Laid-Open Patent Publication No. 2009-140283.

Figure 11:
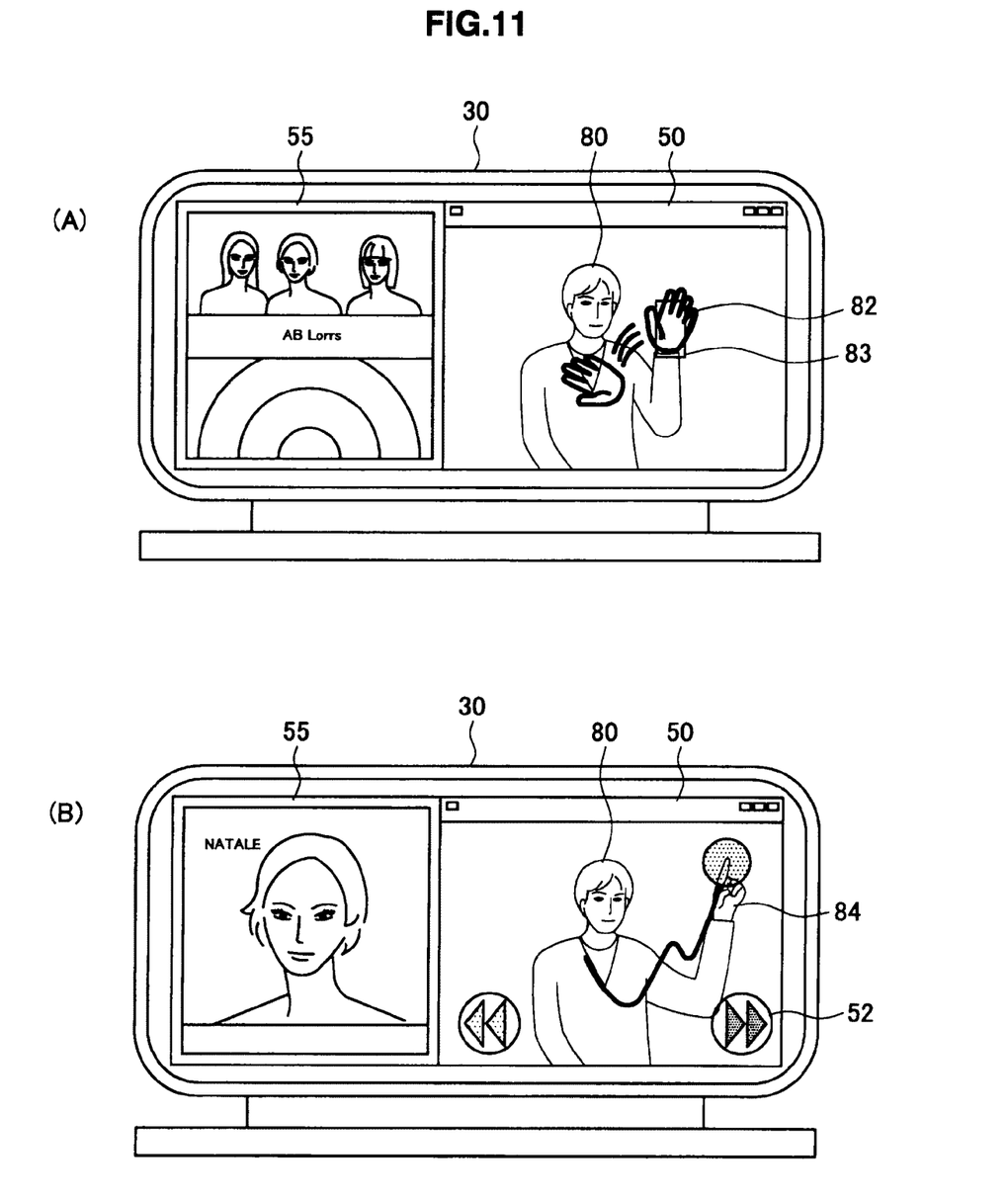
FIGS. 11A and 11B are diagrams useful in showing the screen of the image displaying apparatus 30.

There are two methods of recognizing changes in the shapes and/or positions of a person's hands or body in video images as gestures. One method focuses on relative changes in the person's hands or body that have been recognized. As shown in FIG. 11A, the shapes of the hands are recognized and relative changes in the position of the hands are calculated. FIGS. 11A and 11B are diagrams useful in showing the screen of an image displaying apparatus 30, and show a state where a music player is being operated by software. A jacket photograph 55 of a music CD and a window (image frame) 50, in which an image of a user 80 picked up by a camera 10 is displayed, are displayed on the screen of the image displaying apparatus 30.

Figure 10:
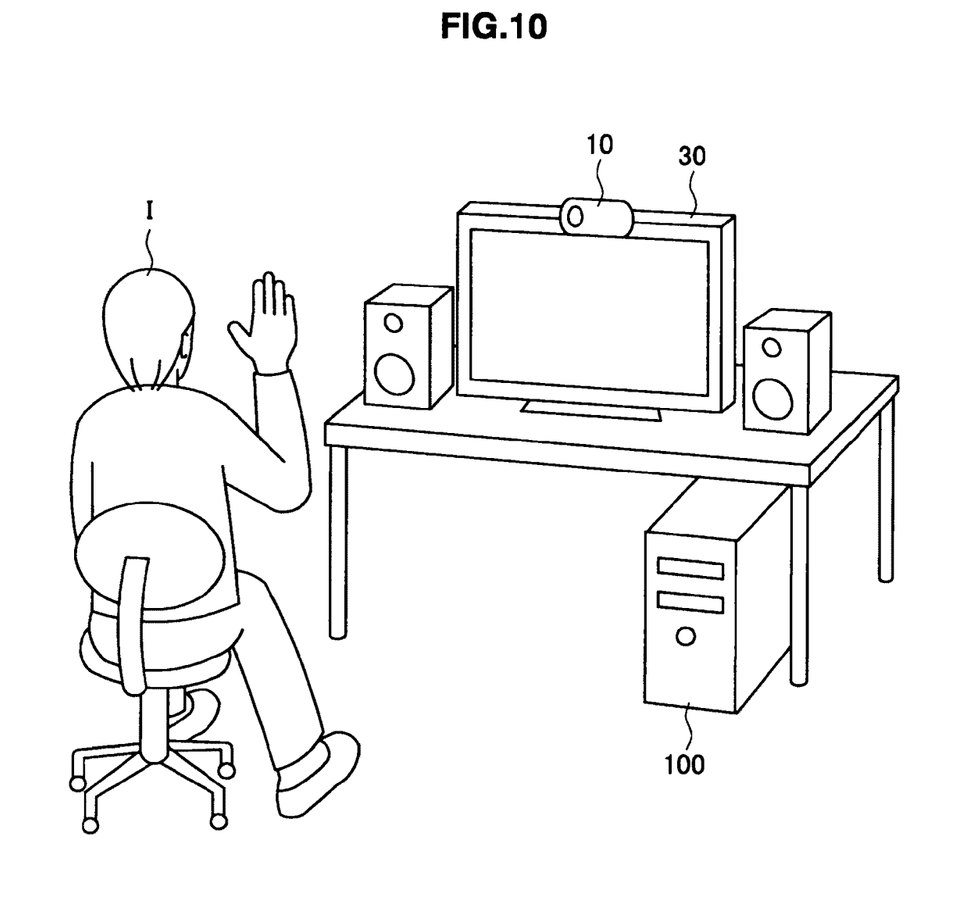
FIG. 10 is a diagram useful in explaining the relationship between the user 1, the camera 10, and the image displaying apparatus 30.

As shown in FIG. 10, the camera 10 is mounted on the image displaying apparatus 30. FIG. 10 is a diagram useful in showing the relationship between a user 1, the camera 10, and the image displaying apparatus 30. Once the user's hand 82 has been recognized, recognition is continually carried out while the user 1 is performing a gesture, and when the hand is next recognized as the hand 83, the relative change between the hand 82 and the hand 83 is decided as a gesture.

As shown in FIG. 11B, the other method recognizes the shape of a hand 84 and uses the absolute position of the hand 84. The absolute coordinates of an image displayed in the window 50 are used to calculate the coordinate position of the recognized hand 84. The hand 84 in the window 50 then interacts with GUI elements such as a button 52 that are displayed by being overlaid (superimposed) at set positions in the image.

However, when the distance between the camera 10 and the user 1 shown in FIG. 10 changes, the size of the user 80 in the image also changes. That is, if the distance between the camera 10 and the user 1 is short, the user 80 will appear large in the image in the window 50 as shown in FIG. 12A, while if the distance between the camera 10 and the user 1 is far, the user 80 will appear small in the image in the window 50 as shown in FIG. 12B.

For this reason, when the user 1 is at a certain position in front of the camera 10, the range in which the hand 84 may move within the image will differ between when the user 80 appears large on the screen and when the user 80 appears small on the screen. When the user 80 appears large on the screen, as shown in FIG. 12A, the hand 84 is capable of moving in the range 62, but when the user 80 appears small on the screen, as shown in FIG. 12B, the hand 84 is capable of moving only in the range 64. Accordingly, if GUI elements such as buttons displayed by being overlaid are always disposed at the same positions set relative to the window 50, when the user 80 appears small on the screen, the user 1 will need to walk around in front of the camera 10 to touch GUI elements such as the button 52. FIGS. 12A and 12B are diagrams useful in showing images displayed in the window 50.

Figure 12:
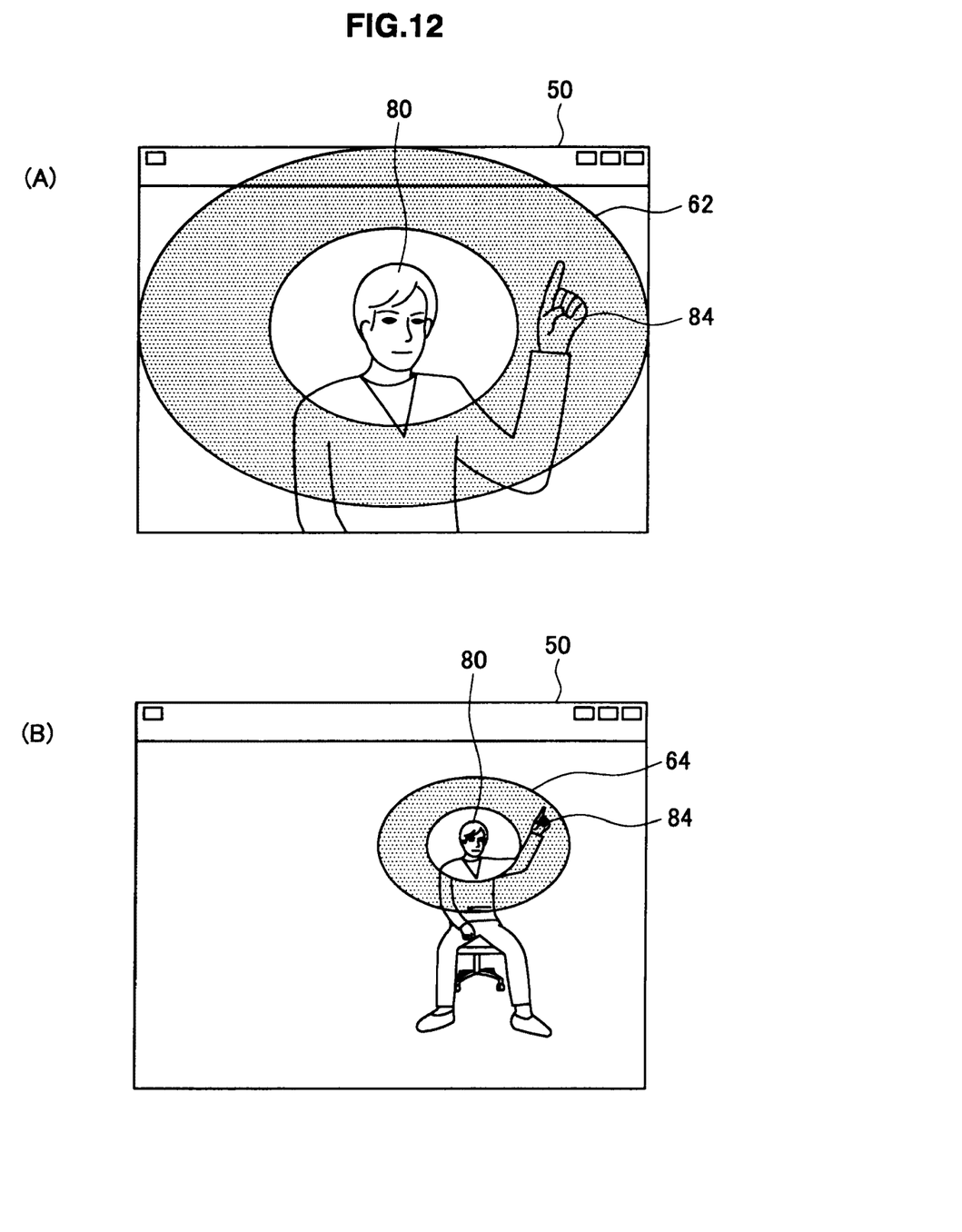
FIGS. 12A and 12B are diagrams useful in showing images displayed in the window 50.

In Publication No. 2009-519552, although a problem occurs in that the size of the user in the image varies according to changes in the distance between the camera and the user as shown in FIGS. 12A and 12B, no consideration whatsoever is given to this problem. Publication No. 2004-78977 meanwhile does not use an image picked up with a camera as a GUI display. However, there is the problem that the distance that the user needs to move to touch a virtual switch that is a GUI element changes in accordance with the distance between the camera and the user.

SUMMARY OF THE INVENTION

The present invention was conceived in view of the problem described above and aims to provide a novel and improved image processing apparatus, image processing method, and program that are capable of reliably disposing GUI elements at positions in an image that are easy to operate for the user.

According to an embodiment of the present invention, there is provided an image processing apparatus including a detecting unit detecting one of an entire person and a part of a person in an image produced by image data acquired by image pickup by an imaging unit, a position/size calculating unit calculating a size and a position of the detected one of the entire person and the part of the person in the image, and a GUI disposing unit disposing graphical user interface (GUI) elements, which are to be displayed by being superimposed on the image produced by the image data, on the image based on the calculated size and position.

The image processing apparatus may further include an extracting unit extracting a region that is part of the image produced by the image data based on the calculated size and position, and an enlargement processing unit enlarging the extracted region that is part of the image in accordance with a size of a screen which displays the image.

The GUI disposing unit may dispose the GUI elements in a range capable of being reached by a hand of the person in the image.

According to another embodiment of the present invention, there is provided an image processing method including steps of detecting one of an entire person and a part of a person in an image produced by image data acquired by image pickup by an imaging unit, calculating a size and a position of the detected one of the entire person and the part of the person in the image, and disposing graphical user interface (GUI) elements, which are to be displayed by being superimposed on the image produced by the image data, on the image based on the calculated size and position.

According to another embodiment of the present invention, there is provided a program causing a computer to carry out steps of detecting one of an entire person and a part of a person in an image produced by image data acquired by image pickup by an imaging unit, calculating a size and a position of the detected one of the entire person and the part of the person in the image, and disposing graphical user interface (GUI) elements, which are to be displayed by being superimposed on the image produced by the image data, on the image based on the calculated size and position.

According to the embodiments of the present invention described above, it is possible to reliably dispose GUI elements at positions in an image that are easy to operate for the user.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
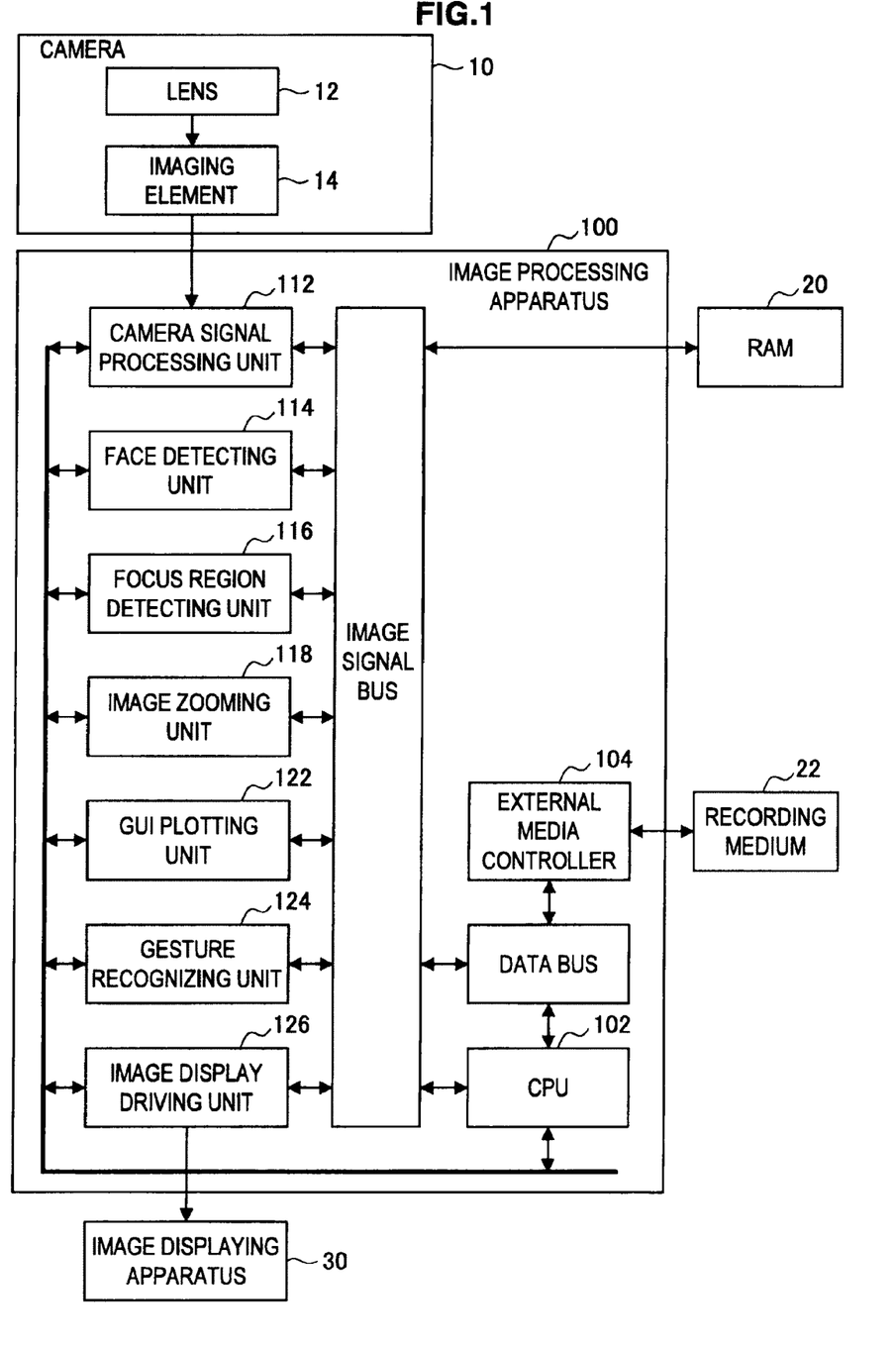
FIG. 1 is a block diagram showing an image processing apparatus 100 according to an embodiment of the present invention.

The following description is given in the order indicated below.
1. Configuration of an Embodiment
2. Operation of the Embodiment
3. Method of Deciding Focus Region 1. Configuration of an Embodiment First, the configuration of an image processing apparatus 100 according to an embodiment of the present invention will be described with reference to FIG. 1. FIG. 1 is a block diagram showing the image processing apparatus 100 according to the present embodiment.

The image processing apparatus 100 according to the present embodiment is connected to a camera 10, an image displaying apparatus 30, and the like. The image processing apparatus 100 may be integrated with the image displaying apparatus 30, such as in the case of a television set, a mobile music player, or a digital photo viewer, or may be a personal computer or the like that is provided separately to the image displaying apparatus 30.

In the camera 10, light from a subject is received via a lens 12 and an electric signal is generated by an imaging element 14. The camera 10 is one example of an "imaging unit". The image processing apparatus 100 receives a signal from the camera 10 and carries out image signal processing. The image displaying apparatus 30 is a liquid crystal display or the like, and displays an image on a screen based on an image signal generated by the image processing apparatus 100.

As shown in FIG. 10, the camera 10 is mounted on the image displaying apparatus 30 and picks up an image of the user 1 present in front of the image displaying apparatus 30 so that the user 1 is displayed on the screen. The image processing apparatus 100 displays GUI elements 54 corresponding to various operations of an application on the screen. This means that by making gestures such as touching the GUI elements with his/her hand that appears on the screen, the user 1 is capable of operating the application. As a result, it is possible to operate an appliance via movements of the user 1 without providing and using an appliance such as a remote controller.

As shown in FIG. 1, as one example, the image processing apparatus 100 includes a CPU 102, an external media controller 104, a camera signal processing unit 112, a face detecting unit 114, a focus region deciding unit 116, an image zooming unit 118, a GUI plotting unit 122, a gesture recognizing unit 124, an image display driving unit 126, and the like.

The CPU 102 carries out calculation processing and control of the component elements of the image processing apparatus 100. The external media controller 104 transmits and receives data to and from a recording medium 22 connected to the image processing apparatus 100. As examples, the recording medium 22 is an optical disc, such as a Blu-ray Disc or a DVD, or a magnetic medium, such as a hard disk drive. The recording medium 22 stores images picked up by the camera 10, files generated by various applications, and the like. The image processing apparatus 100 is also connected to a RAM 20.

Based on the signal received from the camera 10, the camera signal processing unit 112 carries out various image processing such as gain adjustment and contour enhancement to generate image data that has been subjected to image processing.

The face detecting unit 114 functions as a "detecting unit" in combination with the camera 10 and detects the face of the user from picked-up images based on the image data that has been acquired by imaging by the camera 10 and subjected to image processing. Since it is possible to use any technology in common usage as the face detection processing, detailed description thereof is omitted in this specification.

The face detecting unit 114 is one example of a "position/size calculating unit" and calculates the size and position of a face in an image. By doing so, the size and position of the face in the image can be known, and it is possible to recognize whether a person occupies a large region in the image or whether the person occupies a small region. It is also possible to recognize whether the person is positioned near the center of the image or whether the person is positioned away from the center. Information relating to the calculated size and position of the face is sent to the GUI plotting unit 122.

Note that although a case where the face detecting unit 114 is used as a detecting unit that detects part of a person is described in the present embodiment, the detecting unit is not limited to this. As examples, a person detecting means that detects an entire person from image data may be used, or a detecting means that detects a part aside from the face as part of a person may be used.

Also, the detecting unit is not limited to using the image data picked up by the camera 10. For example, in place of the camera 10, it is possible to use a three-dimensional sensor, a movement detecting sensor, a thermosensor, an ultrasonic sensor, an infrared sensor, or the like. In such case, based on detection data acquired by various types of sensor, all or part of a person whose image has been picked up by the camera 10 is detected. By using various types of sensor in place of the camera 10 and obtaining the distance between the person and the sensor according to detection data acquired by the sensor, it is possible to estimate the size of the person in the image based on the distance to the person.

The focus region deciding unit 116 is one example of an "extracting unit" and extracts an entire region or a region that is part of the image based on the calculated size and position of the face. For example, if the person is far away and/or on one side of the image, a region that is part of the image is extracted as the focus region so that the size and position of the person will be appropriate in the image after an extraction process and an enlarging process have been carried out. If the person is at an appropriate position in the image, the entire region of the image is extracted as the focus region.

If a region that is part of the image has been extracted, the image zooming unit 118 enlarges the extracted region that forms part of the image in accordance with the screen that displays images. By doing so, the person in the image can be displayed having been enlarged.

The GUI plotting unit 122 displays GUI elements overlaid on the image produced by the image data. The GUI elements are buttons, icons, and the like corresponding to various operations of an application or the like. The GUI plotting unit 122 is one example of a "GUI disposing unit" and disposes GUI elements in an image based on the calculated size and position of the face of the person in the image. When doing so, the GUI plotting unit 122 disposes the GUI elements in a range where the elements are easy to reach for the hand of the person in the image without the person having to move. By doing so, it becomes easy for the person to make operations such as touching the GUI elements in the image.

The gesture recognizing unit 124 recognizes the shape of the hand of the person in the image and recognizes a gesture based on the shape pattern and changes in position of the hand. Since it is possible to use any technology in common usage as the gesture recognition processing, detailed description thereof is omitted in this specification. The gesture recognizing unit 124 uses absolute coordinates in the image to calculate the coordinate position of the recognized hand. The gesture recognizing unit 124 then recognizes whether the GUI elements disposed by the GUI plotting unit 122 and the hand coincide and recognizes operations of the hand on the GUI elements. The gesture recognizing unit 124 generates an operation signal that operates an application corresponding to a gesture.

The image display driving unit 126 generates an image signal for displaying images on the screen of the image displaying apparatus 30 based on the image data acquired by imaging by the camera 10 and image data relating to the GUI elements. The image display driving unit 126 sends a generated image signal to the image displaying apparatus 30. By doing so, the image displaying apparatus 30 is capable of displaying the GUI elements superimposed on the images produced by the camera 10 on the screen.

2. Operation of the Embodiment

Figure 2:
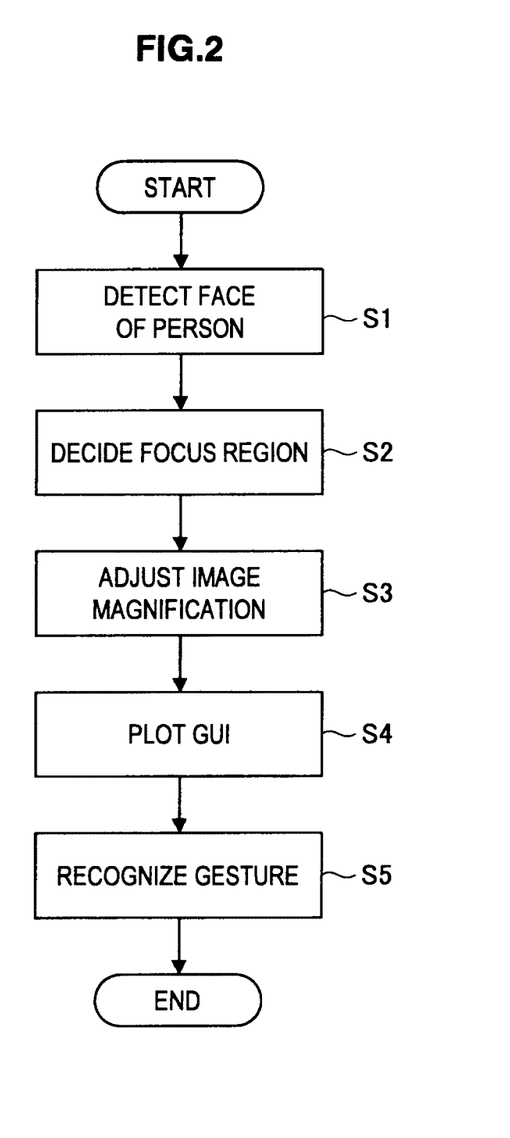
FIG. 2 is a flowchart showing the operation of the image processing apparatus 100 according to the same embodiment.

Next, the operation of the image processing apparatus 100 according to the present embodiment will be described. FIG. 2 is a flowchart showing the operation of the image processing apparatus 100 according to the present embodiment.

First, an image of the user 1 in front of the image displaying apparatus 30 is picked up by the camera 10. After this, a face region 164 of the user is detected from a camera image 160 shown in the upper image in FIG. 6 based on image data that has been acquired by imaging by the camera 10 and subjected to image processing (step S1). If the face of the user is detected, the size and position of the face in the image are calculated.

Figure 3:
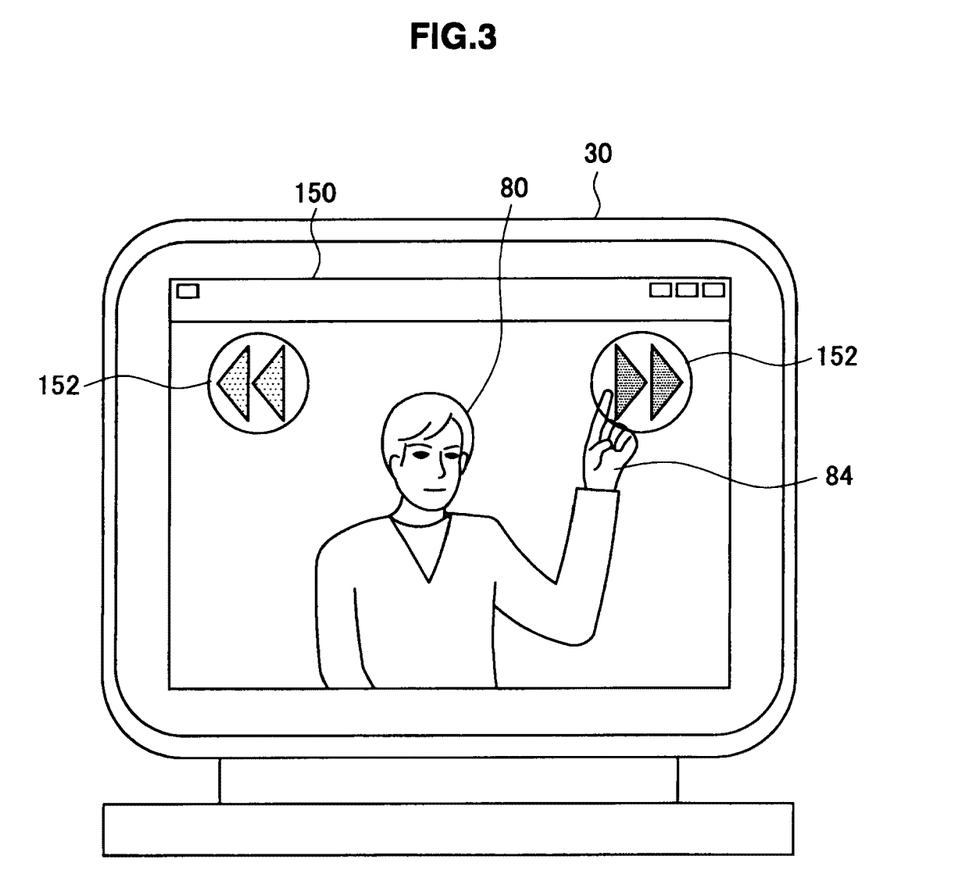
FIG. 3 is a diagram useful in showing a screen of an image displaying apparatus 30.
Figure 6:
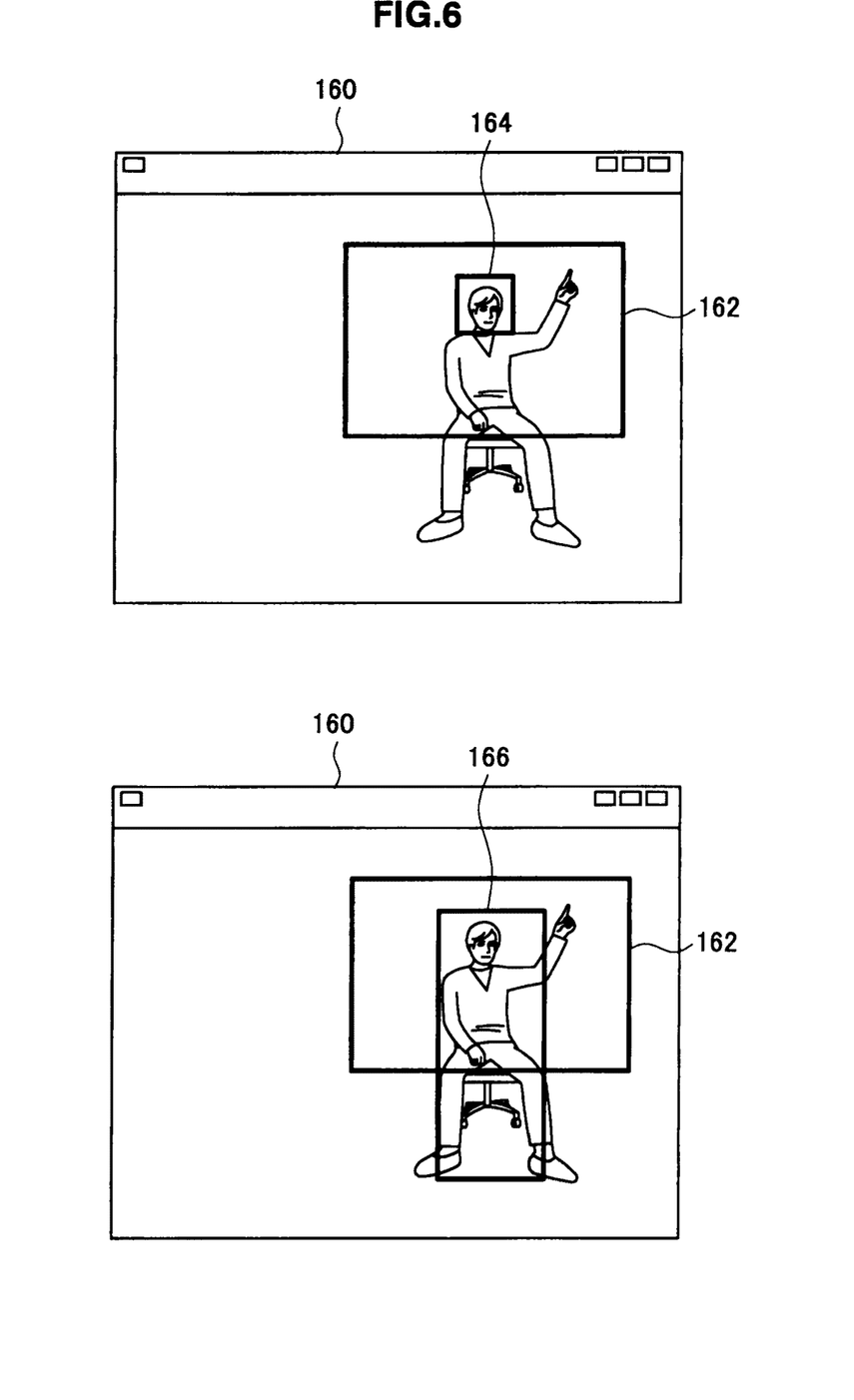
FIG. 6 is a diagram useful in showing the camera image 160.

Next, based on the calculated size and position of the face, a region that forms part or all of the image is extracted as a focus region 162 as shown in the upper image in FIG. 6 (step S2). For example, when the camera images are displayed on the image displaying apparatus 30 without amendment, as shown in FIG. 3, if the size and position of a user 80 in the image in a window 150 are appropriate, the entire region of the image is extracted as the focus region. Meanwhile, as shown in FIG. 4A, in cases such as where the user appears small in the camera image 160 and where the user is positioned to the side in the camera image 160, a region that forms part of the image is extracted as the focus region 162.

Note that as shown in the lower image in FIG. 6, it is also possible to use person detection to detect a person region 166 from the camera image 160 and to extract a focus region 162 based on the person region 166.

Next, when a camera image is displayed on the image displaying apparatus 30, the magnification (zoom) of the image is adjusted (step S3). Adjustment of the magnification may be carried out by an electronic zoom or by a mechanical zoom that uses a zoom mechanism of the camera 10. As one example, if, as shown in FIG. 3, the size and position of the user 80 in the image in the window 150 are appropriate, adjustment of the magnification is not carried out. Meanwhile if, as shown in FIG. 4A, when the user appears small in the camera image 160, the focus region 162 is magnified in accordance with the window 150 and is displayed as an enlarged image as shown in FIG. 4B. By doing so, it is possible to always keep the usability of the GUI the same for the user regardless of the distance between the user 1 and the camera 10.

Figure 4:
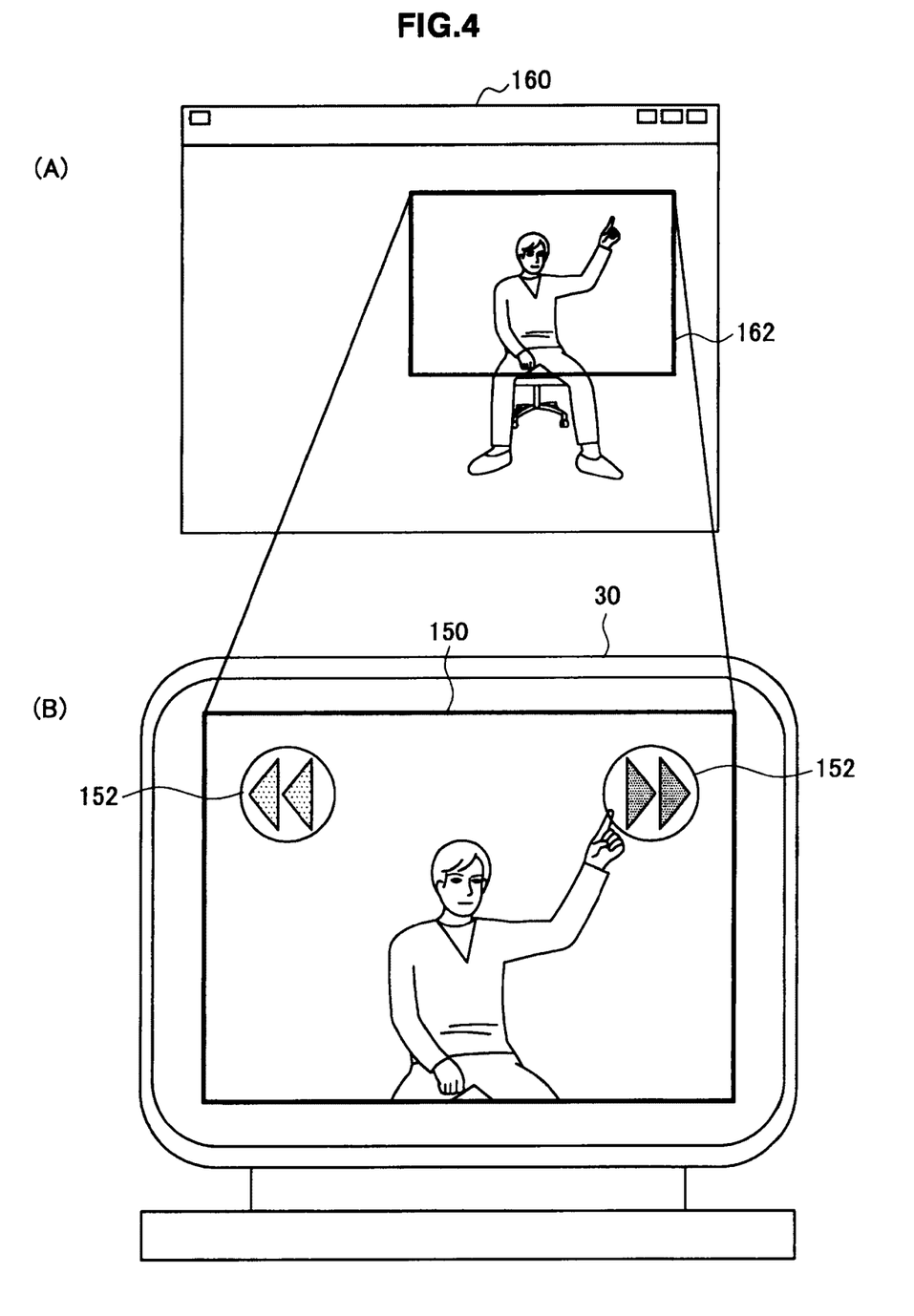
FIGS. 4A and 4B are diagrams useful in showing a camera image 160 and the screen of the image displaying apparatus 30.
Figure 5:
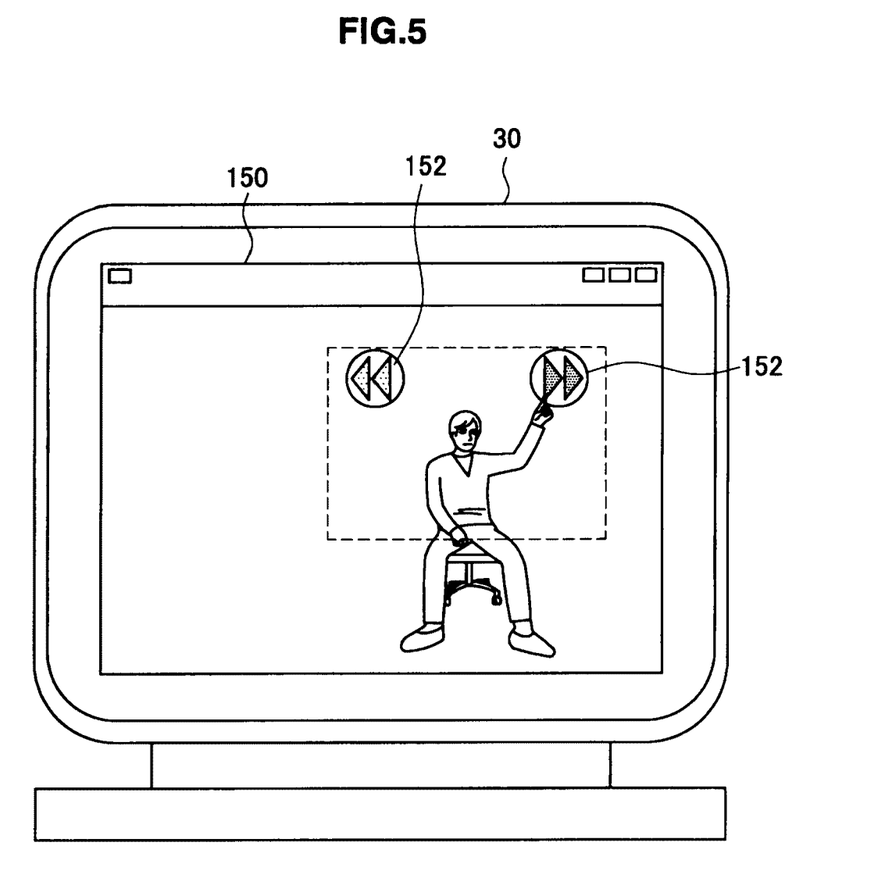
FIG. 5 is a diagram useful in showing the screen of the image displaying apparatus 30.

Note that even when the user appears small in the camera image 160 as shown in FIG. 4A, an image may be displayed in the window 150 with no adjustment to the size of the camera image 160 as shown in FIG. 5.

Next, if part of the image has been decided as the focus region, the extracted region that is part of the image is enlarged in accordance with the screen on which the image is displayed. If the entire region is decided as the focus region, the enlarging process is not carried out.

After this, the GUI elements are disposed at appropriate positions in the image based on the calculated size and position of the face in the image. Next, the GUI elements are displayed having been overlaid on the image produced by the image data (step S4). For example, as shown in FIGS. 3 and 4B, GUI elements such as the buttons 152 are displayed near the user 80. Also, as shown in FIG. 5, even if the image is not enlarged, GUI elements such as the buttons 152 are disposed near the user. By doing so, it is always possible for the user to touch and operate the GUI elements without moving.

Next, the shape of the hand of the person in the image is recognized and a gesture is recognized based on changes in the shape pattern and/or position of the hand (step S5). For example, coincidence of a GUI element and the hand and an operation of a GUI element by the hand are recognized. After this, an operation signal that operates an application is generated corresponding to the gesture. By doing so, it is possible to operate an application by way of gestures.

3. Method of Deciding Focus Region

Figure 7:
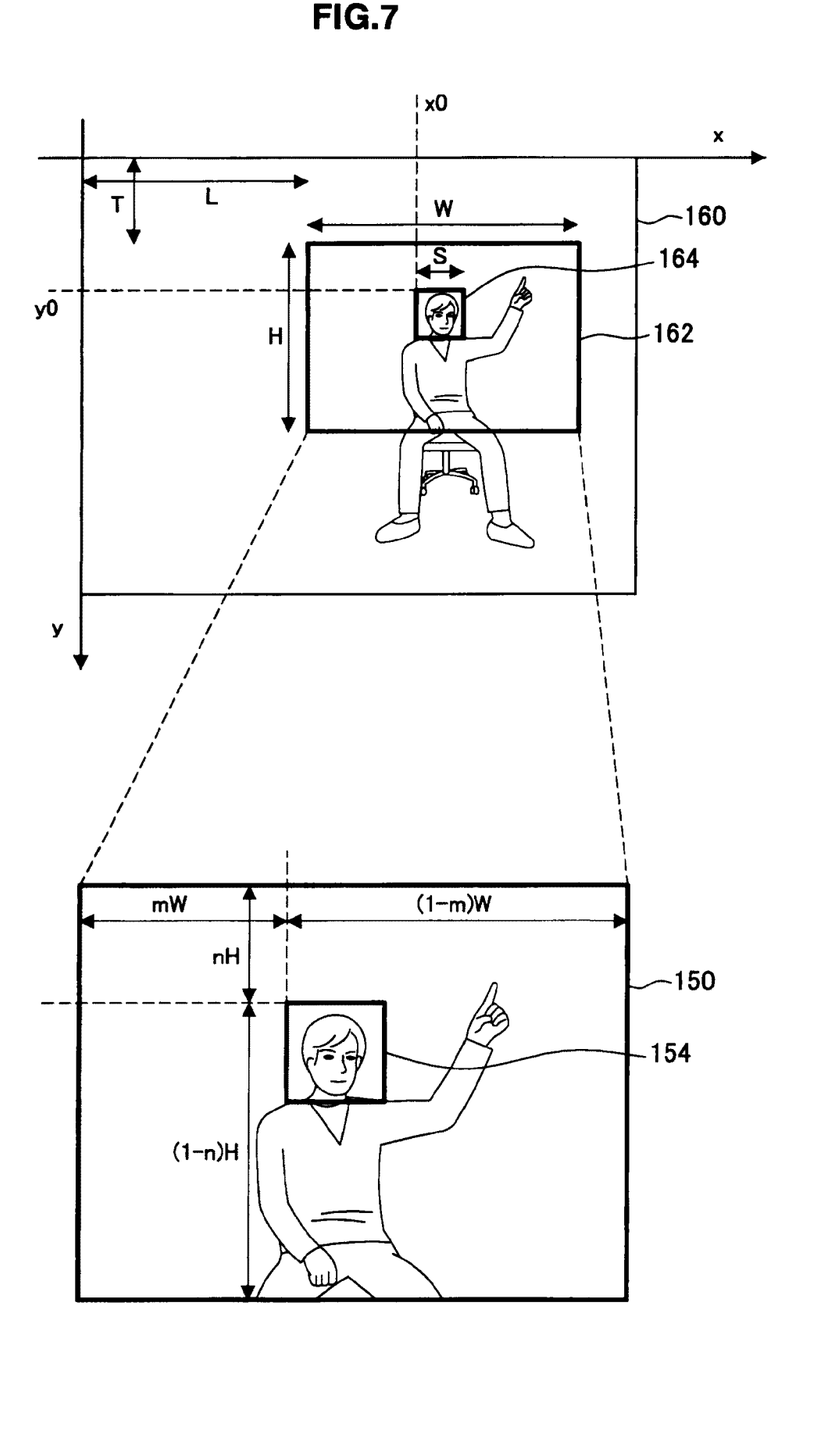
FIG. 7 is a diagram useful in showing an absolute coordinate system of the image 160 produced by the camera 10 and a focus region 150 extracted from the image 160.

Next, the deciding of the focus region using the detected face region will be described. FIG. 7 is a diagram useful in showing the absolute coordinates of the image 160 produced by the camera 10 and a focus region 150 extracted from the image 160.

First, a method of deciding the size and position of the focus region 150 will be described with reference to FIG. 7.

Once a face is detected in the image, the face detecting unit 114 calculates and outputs a face position (x0, y0) and a face size S in an absolute coordinate system of the image 160 produced by the camera 10. When doing so, if the size of the focus region 162 is W×H and the position of the focus region 150 is (L,T), W, H, L, and T are expressed by the respective Equations 1 to 4 below.

$$W = wS \quad \text{(Equation 1)}$$

$$H = hS \quad \text{(Equation 2)}$$

$$L = x0 - mW \quad \text{(Equation 3)}$$

$$T = y0 - nH \quad \text{(Equation 4)}$$

Here, w, h are parameters for deciding the size W×H of the focus region 162 from the face size S. Also, m, n are parameters that satisfy the conditions (Equations 5 and 6) given below for deciding the position (L,T) of the focus region 162.

$$0 \leq m \leq 1 \quad \text{(Equation 5)}$$

$$0 \leq n \leq 1 \quad \text{(Equation 6)}$$

Next, the method of deciding the position of the focus region 150 expressed by the equations given above will be described.

First, as shown in the upper image in FIG. 8, a case where the focus region 150 is set so that the detected face region is in the center will be described.

Figure 8:
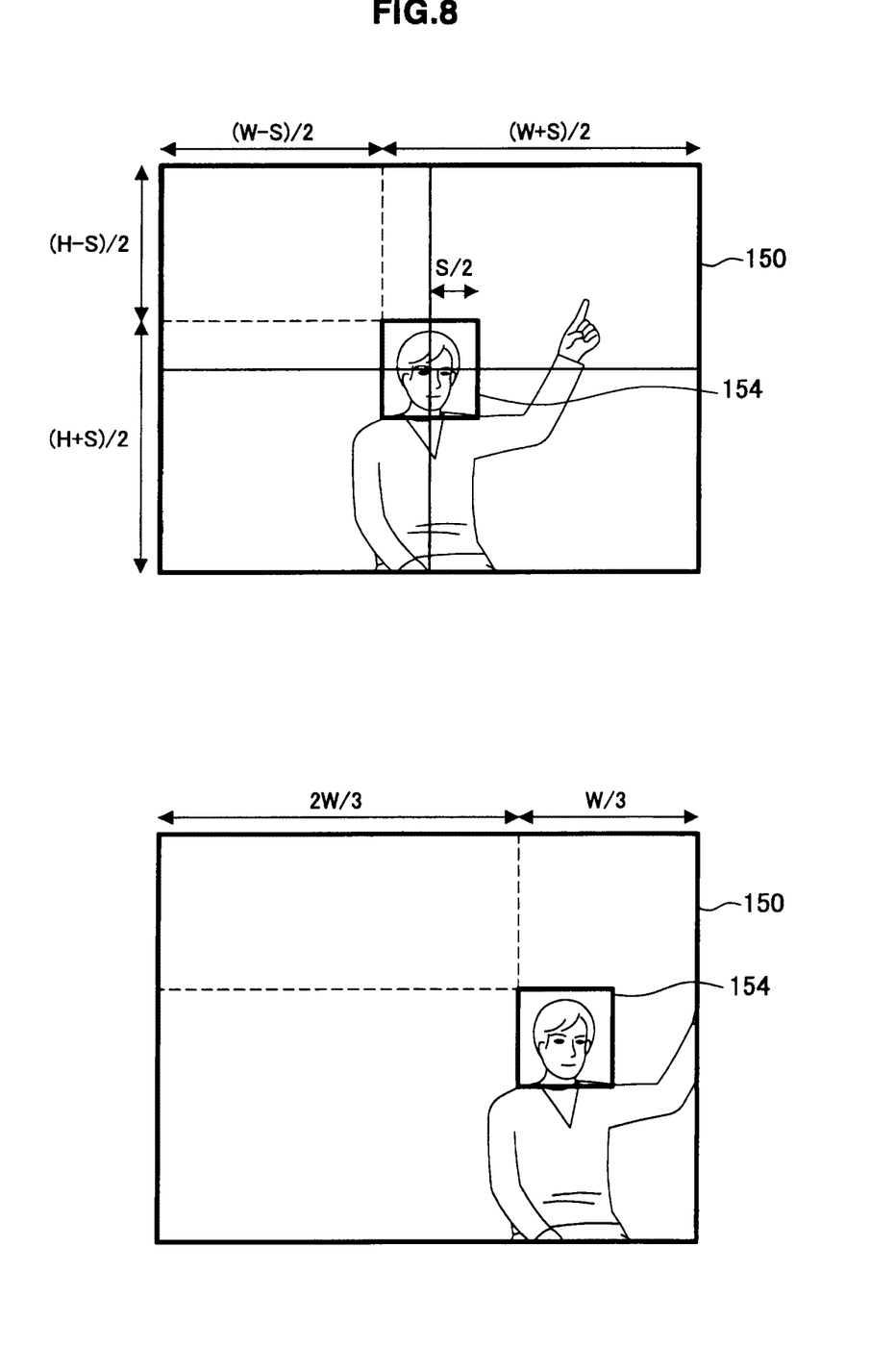
FIG. 8 is a diagram useful in showing an image displayed in the window 150.

Here, when w=h=6 is set as one example, and the parameters m and n are decided as shown below, $$m = \frac{1 - \frac{S}{W}}{2} \quad \text{(Equation 7)}$$

$$n = \frac{1 - \frac{S}{H}}{2} \quad \text{(Equation 8)}$$

as shown in the upper image in FIG. 8, it is possible to decide the position of the focus region 150 so that the face region 154 is in the center of the focus region 150.

A case will now be described where the focus region 150 is set as shown in the lower image in FIG. 8 so that the detected face region is in the center in the height direction and on the right side in the horizontal direction.

Here, when w=h=6 is set as one example, the parameter m is given by Equation 8 above, and the parameter m is decided as $$m = 2/3 \quad \text{(Equation 9)}$$

as shown in the lower image of FIG. 8, it is possible to decide the position of the focus region 150 so that the face region 154 is on the right of the focus region 150.

Note that the settings of the parameters given above are merely examples and the present invention is not limited to such examples. It is also possible to set the parameters in various ways.

Figure 9:
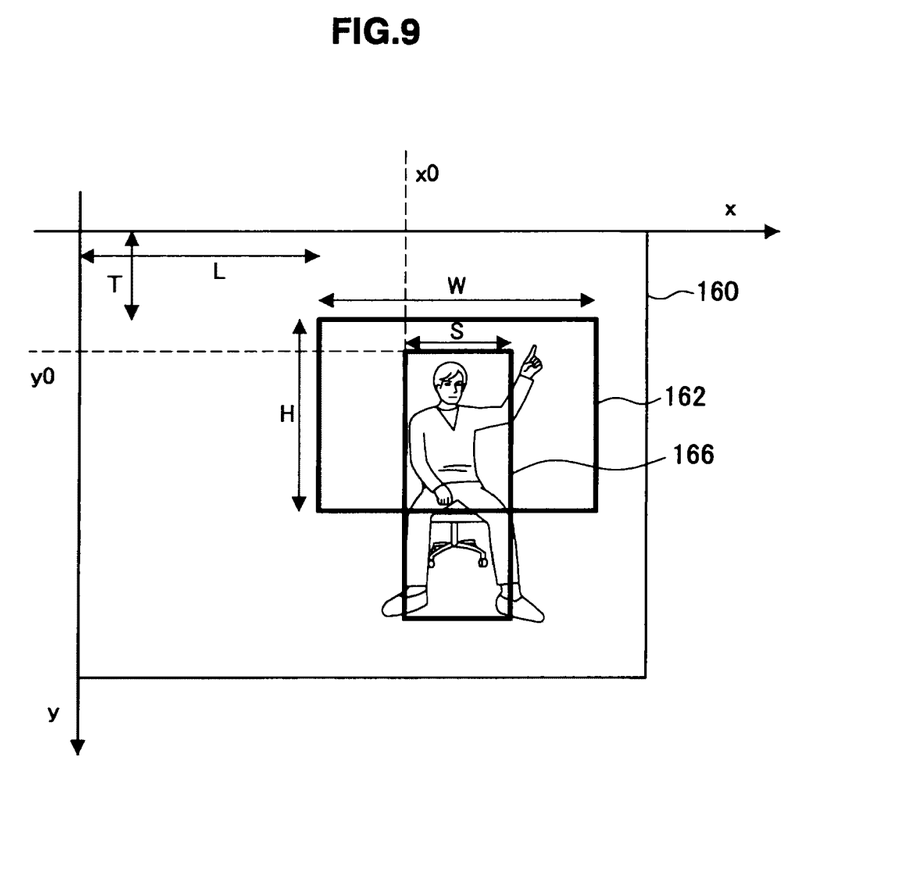
FIG. 9 is a diagram useful in showing an absolute coordinate system of the image 160 produced by the camera 10.

Next, the method of deciding the focus region when detecting an entire person using the camera 10 and when various sensors aside from the camera 10 are used will be described. FIG. 9 is a diagram useful in showing an absolute coordinate system of the image 160 produced by the camera 10.

Even if a person detecting means for detecting an entire person is used instead of the face detecting unit 114, first the person's position (x0,y0) and size S are calculated and outputted in the same way as when the face detecting unit 114 decides the focus region from the face position and face size. After this, it is possible to decide the size W×H of the focus region 162 and the position (L,T) of the focus region 162 in the same way as when face detection is carried out.

In addition, even if a different type of people sensor such as a three-dimensional sensor, a movement detecting sensor, a thermosensor, an ultrasonic sensor, or an infrared sensor is used instead of the camera 10, by using the position (x0,y0) and the size S outputted by the sensor, it is possible to decide the size and position of the focus region.

Since it is possible according to the present embodiment described above to plot GUI elements in an image in a range that can be reached by the user's hand, for example, it is possible for the user to interact with the GUI elements by merely extending his/her hands while seated or standing in front of the camera and without having to move. Conventionally, when disposing GUI elements, no consideration was given to the positional relationship between the camera and the person. Conversely, with the present embodiment, attention is given to the positional relationship between the camera and the person and when the size and/or position of a person in the image has/have changed, the area in the image where the GUI elements may be disposed is changed and the GUI elements are disposed at appropriate positions. As a result, it is always easy for the user to operate the GUI elements in the image.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-052920 filed in the Japan Patent Office on Mar. 10, 2010, the entire content of which is hereby incorporated by reference.

What is claimed is:

1. An image processing apparatus comprising:
   a detecting unit configured to detect one of an entire person and a part of a person in an image produced by image data acquired by image pickup by an imaging unit;
   a position and size calculating unit configured to calculate a size and a position of the detected one of the entire person and the part of the person in the image;
   a graphical user interface (GUI) disposing unit configured to dispose GUI elements, which are to be displayed by being superimposed on the image produced by the image data, on the image based on the calculated size and position; and
   a processing unit implemented by circuitry and configured to
   extract a first region that is a part of the image produced by the image data, in response to the calculated size being determined as being small, and to extract a second region that is an entirety of the image, including the region that is a part of the image, in response to the calculated size being determined as being large,
   enlarge, in response to the first region being extracted, the extracted first region that is a part of the image in accordance with a size of a screen which displays the image, and
   center, in response to the first region being extracted, the extracted first region that is a part of the image with respect to the screen, in response to the extracted first region being off-center from a center position of the screen, wherein
   the GUI disposing unit disposes the GUI elements on the image after the processing unit enlarges and centers the extracted first region that is a part of the image, without disposing GUI elements prior to the processing unit enlarging and centering the extracted first region that is a part of the image.

2. The image processing apparatus according to claim 1, wherein the GUI disposing unit disposes the GUI elements in a range capable of being reached by a hand of the person in the image.

3. The image processing apparatus according to claim 1, wherein the detecting unit detects the entire person in the image produced by the image data.

4. The image processing apparatus according to claim 1, wherein the detecting unit detects a face of the person in the image produced by the image data.

5. The image processing apparatus according to claim 1, further comprising:
   a gesture recognizing unit configured to recognize a hand gesture of the person and to determine whether a GUI element of the GUI elements coincides with the hand gesture of the person, after the position and size calculating unit calculates the size and the position of the detected one of the entire person and the part of the person in the image, and after the GUI disposing unit disposes the GUI elements.

6. The image processing apparatus according to claim 1, wherein the size and the position are associated with a distance and location of the person relative to the imaging unit.

7. The image processing apparatus according to claim 1, wherein the GUI elements include icons that correspond to operations of an application.

8. The image processing apparatus according to claim 1, wherein
   the processing unit is further configured to extract the first region that is a part of the image produced by the image data, in response to the calculated size being determined as being small and in response to the calculated position being off-center from the center position, and
   the processing unit is further configured to extract the second region that is the entirety of the image, including the first region that is a part of the image, in response to the calculated size being determined as being large and in response to the calculated position being at the center position.

9. The image processing apparatus according to claim 1, wherein
   the processing unit is further configured to extract the first region such that a face of the person is at a center of the first region.

10. An image processing method for an image processing apparatus including a processor, the image processing method comprising steps of:
    detecting one of an entire person and a part of a person in an image produced by image data acquired by image pickup by an imaging unit;
    calculating, by the processor, a size and a position of the detected one of the entire person and the part of the person in the image;
    disposing graphical user interface (GUI) elements, which are to be displayed by being superimposed on the image produced by the image data, on the image based on the calculated size and position;
    extracting a first region that is a part of the image produced by the image data, in response to the calculated size being determined as being small, and extracting a second region that is an entirety of the image, including the first region that is a part of the image, in response to the calculated size being determined as being large;
    enlarging, in response to the extracting of the first region, the extracted first region that is a part of the image in accordance with a size of a screen which displays the image; and
    centering, in response to the extracting of the first region, the extracted first region that is a part of the image with respect to the screen, in response to the extracted first region being off-center from a center position of the screen, wherein
    the disposing disposes the GUI elements on the image after the enlarging enlarges and the centering centers the extracted first region that is a part of the image, without disposing GUI elements prior to the enlarging enlarging and the centering centering the extracted first region that is a part of the image.

11. A non-transitory computer-readable storage medium including computer executable instructions, wherein the instructions, when executed by a computer, cause the computer to perform a method, the method comprising:
    detecting one of an entire person and a part of a person in an image produced by image data acquired by image pickup by an imaging unit;
    calculating a size and a position of the detected one of the entire person and the part of the person in the image;
    disposing graphical user interface (GUI) elements, which are to be displayed by being superimposed on the image produced by the image data, on the image based on the calculated size and position;

extracting a first region that is a part of the image produced by the image data, in response to the calculated size being determined as being small, and extracting a second region that is an entirety of the image, including the first region that is a part of the image, in response to the calculated size being determined as being large;

enlarging, in response to the extracting of the first region, the extracted first region that is a part of the image in accordance with a size of a screen which displays the image; and centering, in response to the extracting of the first region, the extracted first region that is a part of the image with respect to the screen, in response to the extracted first region being off-center from a center position of the screen, wherein the disposing disposes the GUI elements on the image after the enlarging enlarges and the centering centers the extracted first region that is a part of the image, without disposing GUI elements prior to the enlarging enlarging and the centering centering the extracted first region that is a part of the image.

12. An image processing apparatus comprising:
a processing circuit configured to
  detect one of an entire person and a part of a person in an image produced by image data acquired by image pickup by an imaging device,
  calculate a size and a position of the detected one of the entire person and the part of the person in the image,
  dispose graphical user interface (GUI) elements, which are to be displayed by being superimposed on the image produced by the image data, on the image based on the calculated size and position,
  extract a first region that is a part of the image produced by the image data, in response to the calculated size being determined as being small, and extract a second region that is an entirety of the image, including the first region that is a part of the image, in response to the calculated size being determined as being large,
  enlarge, in response to the first region being extracted, the extracted first region that is a part of the image in accordance with a size of a screen which displays the image, and
  center, in response to the first region being extracted, the extracted first region that is a part of the image with respect to the screen, in response to the extracted first region being off-center from a center position of the screen, wherein
the processing circuit disposes the GUI elements on the image after the processing circuit enlarges and centers the extracted first region that is a part of the image, without disposing GUI elements prior to the processing circuit enlarging and the centering the extracted first region that is a part of the image.

* * * * *